Figure 1:
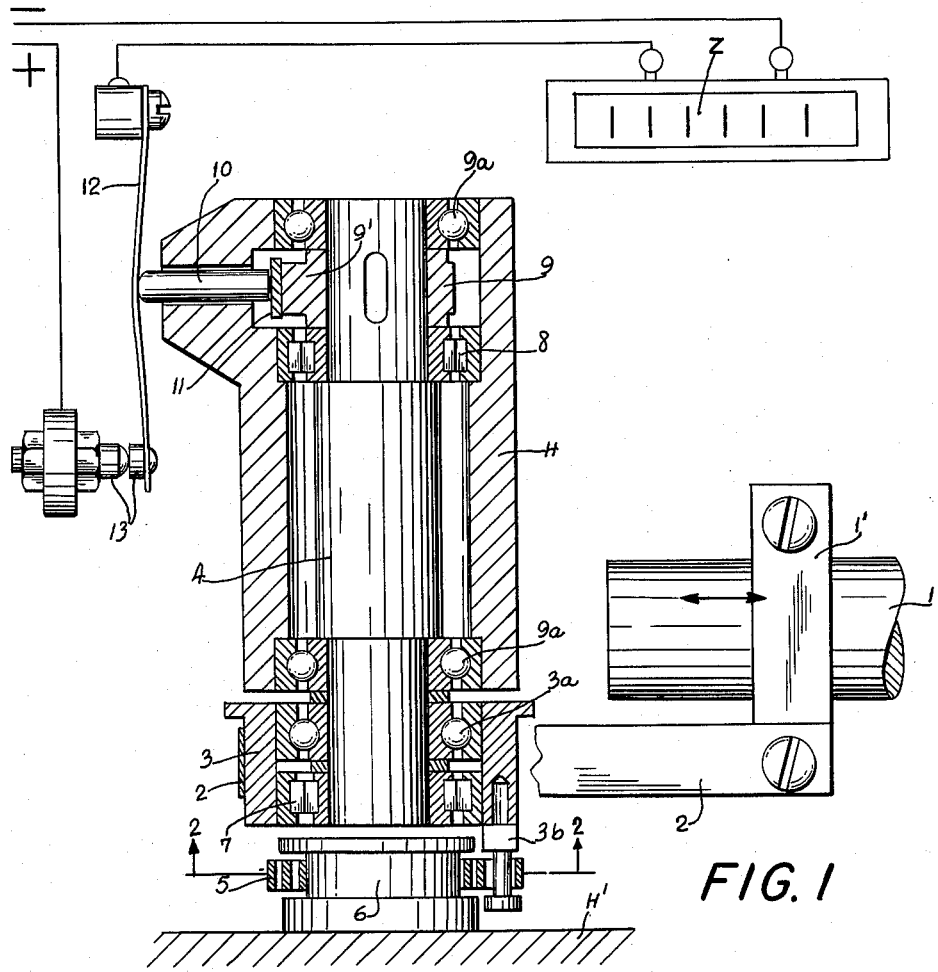

March 29, 1966  W. BLIESE  3,243,109
DEVICE FOR INTEGRATING EQUIDIRECTIONAL
MOVEMENT OF A RECIPROCATING OBJECT
Filed June 9, 1964

INVENTOR
Werner Bliese
BY
Michael S. Striker
ATTORNEY

United States Patent Office 3,243,109
Patented Mar. 29, 1966

3,243,109
DEVICE FOR INTEGRATING EQUIDIRECTIONAL MOVEMENT OF A RECIPROCATING OBJECT
Werner Bliese, Hamburg-Rahlstedt, Germany, assignor to Bran & Lubbe, Hamburg, Germany
Filed June 9, 1964, Ser. No. 373,695
Claims priority, application Germany, June 15, 1963, B 72,309
6 Claims. (Cl. 235—61)

The present invention concerns a device for measuring and summing up the lengths of movements carried out by a movable object or machine member in one particular direction, irrespective of whether these individual lengths of movements carried out consecutively are uniform, different from each other or irregularly variable. More specifically the device according to the invention is useful for measuring and summing up the lengths of the strokes of a piston irrespectively of the stroke frequency and of the sometimes varying lengths of the individual strokes.

Ordinary and well known stroke counters cannot furnish the desired information because these counters determine only the number of strokes carried out during a given period of time but disregarding the lengths of the various strokes. In contrast therewith the device according to the invention is excellently suitable e.g. for determining the efficiency and the delivery over a given period of time of piston pumps, but the device according to the invention is also similarly valuable in other fields of mechanical technology.

It is one object of this invention to provide for a device of the type set forth which is comparatively simple in construction and reliable in operation.

With the above object in view the invention includes a device for integrating a sequence of equidirectional movements of an object reciprocating relative to a normally stationary frame, particularly for measuring the sum of the lengths of consecutive strokes in one direction of a reciprocating piston. In this device a shaft is provided which is rotatably supported in the frame. Motion transfer means are operatively connected between shaft means and the reciprocating object for converting only those strokes of the reciprocating object which are carried out in one predetermined direction into a corresponding rotary movement of the shaft means in one direction. Counting means are operatively connected with the shaft means for counting the number of rotary movements thereof through predetermined units of rotary motion i.e. a predetermined angle of rotation thereof which may amount to a complete revolution or to predetermined fractions thereof. The result of such counting operation during a given period of time is then an indication of the sum total of the lengths of said strokes of said reciprocating object carried out during such period of time.

Figure 2:
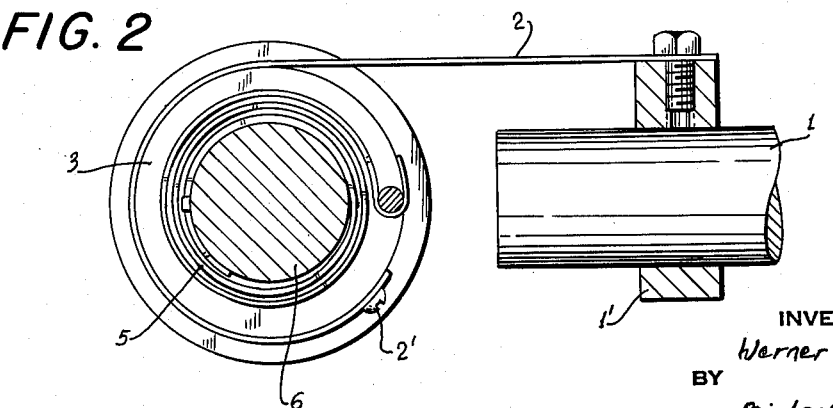

The novel features which are considered as characteristic for the invention are set forth in particular in the appended claims. The invention itself, however, both as to additional objects and advantages thereof, will be best understood from the following description of specific embodiments when read in connection with the accompanying drawing, in which:

FIG. 1 is a plan view of an arrangement according to the invention, partly shown as an axial section taken in a plane including the axis of rotation of the rotary shaft of the device; and FIG. 2 is an elevation of the arrangement according to FIG. 1, partly in section taken along line II—II of FIG. 1.

In the illustrated example of an embodiment of the invention the reciprocating object is assumed to be a piston of which a portion 1 is shown in FIGS. 1 and 2. This piston 1 is further assumed to be moving in relation to a usually stationary frame which would in this example include the housing H and the frame portion H'.

In the housing portion H there is arranged a shaft 4 which is rotatably supported by means of ball bearings 9a. One end of the shaft 4 carries a ball bearing 3a which supports rotatably a disc or pulley 3 so that the latter is freely rotatable relative to the shaft 4.

The reciprocating movements of the piston are transmitted to the disc 3. An at least partly flexible pulling member e.g. a strip 2 is attached to a clamping member 1' clamped in a desired position to the portion 1 of the reciprocating piston, while the other end of the strip 2 is at least partly wound around the circumference of the disc 3 as can be seen from FIG. 2 and attached thereto for instance by a screw 2'. Of course, the strip 2 could be made of any suitable material and could also be replaced by a cord, cable, chain or the like. It is clear that a movement of the piston 1 in the direction to the right as seen on the drawing would produce a corresponding rotational movement of the disc 3 in clockwise direction. In order to assure that the disc 3 turns in opposite direction i.e. anti-clockwise when the piston returns in direction to the left, a return spring 5 is wound about, and attached with its inner end to, a stationary stud 6 carried by the frame portion H' while the outer end of the spiral spring 5 is attached to a pin 3b which is mounted on the free side of the disc 3. Upon clockwise movement of the disc 3 the spring 5 is tensioned and upon the return stroke of the piston 1 the tension of the spring causes the disc to rotate in anti-clockwise direction to an extent which corresponds to the length of the back stroke of the piston 1.

In order to transfer the rotary motion of the disc 3 which takes place in one direction only e.g. in this case in clockwise direction, a conventional overrunning clutch device 7 is operatively interposed between the disc 3 and the above mentioned end portion of the shaft 4. This device 7 may in a simple case be of the ratchet-and-pawl type but may advantageously be any one of the well known overrunning clutches which start to transmit motion from the moving clutch member to the driven clutch member almost immediately upon the start of rotation of the moving member the clutch being mounted coaxially with the shaft 4. On account of this arrangement every stroke of the piston 1 in one direction e.g. in direction to the right as seen on the drawing is converted in a clockwise rotary movement of the shaft 4 the actual length of the stroke of the piston 1 having a fixed proportion to the amount or angle of rotation of the shaft 4.

In order to avoid errors it is advisable to mount between another portion of the shaft 4 and the relatively stationary housing H a device 8 which prevents rotation of the shaft 4 in a direction opposite to the one which corresponds to the strokes of the piston which are to be counted. The device 8 may again be a ratchet-and-pawl device or a device of the general type of overrunning clutches mounted coaxially with the shaft 4 as mentioned above.

It will be understood from the above that the total sum of the lengths of the strokes carried out by the piston 1 in a selected direction will be represented exactly, at a fixed ratio depending upon the diameter of the disc 3, by the total amount of rotation in one direction of the shaft 4. In order to measure this sum of the lengths of the individual measured strokes of the pitson 1 it is necessary to measure the amount of rotation of the shaft 4 or to count the number of rotary movements thereof through predetermined units of rotary motion. The unit of rotary motion may be a full revolution of the shaft 4. In this case, as illustrated by way of example in FIG. 1, a cam disc 9 having only one lobe 9' may be mounted on a portion of the shaft 4 and actuate upon every completed revolution of the shaft 4 on a pin 10 slidably mounted in the housing H, the outer end of the pin being always in engagement with a spring 12 carrying at its outer end one of two cooperating contact pieces 13 while the other end of the spring 12 is mounted on a stationary support just as this is the case with the second one of the contacts 13. Consequently, once with every revolution of the shaft 4 the contact members 13 are moved into the engaged position illustrated in the drawing. The contacts 13 may be connected in an electric circuit as shown which serves to operate a conventional counting device Z which would count and indicate the number of contact closing actions during a given period of time and thus indicate the number of revolutions of the shaft 4 during that period of time and therefore indirectly the sum total of the lengths of the strokes of the reciprocating piston 1 carried out in one selected direction during such period of time. If for instance the total displacement or delivery of a piston pump is to be measured and indicated then it is of course possible to calibrate the counter Z in such a manner that taking into consideration all the factors and characteristics of the arrangement the delivery is indicated directly in units of cubic measurement e.g. in gallons.

For smooth operation it may be advisable to interpose between the cam disc 9 and the rear end of the pin 10 a cam follower member 11 which may be a lever or spring mounted in the housing H so as to extend substantially in the direction of a tangent to the circular arc followed by the lobe 9' during a rotation of the shaft 4. Moreover, it is of course also possible to provide the disc 9 with a plurality of lobes so that the circuit for the counter Z would be closed more than once during each revolution of the shaft 4 so that in this case the unit of rotary motion would be a fraction of a full revolution of the shaft 4, the fraction depending upon the number of lobes on the cam disc 9. In this manner also the corresponding indication of the counter Z would be effected in correspondingly smaller units which is sometimes desirable.

It can be seen from the above that the arrangement according to the invention furnishes information about the operation of a reciprocating object, particularly of a reciprocating piston, which cannot be obtained from ordinary counters which only indicate the number of strokes but do not furnish information about the effect of these strokes.

It will be understood that each of the elements described above, or two or more together, may also find a useful application in other types of a device for integrating a sequence of equidirectional movements of an object reciprocating relative to a frame differing from the types described above.

While the invention has been illustrated and described as embodied in a device for integrating a sequence of equidirectional movements of an object reciprocating relative to a frame including motion transfer means operatively connected between a rotary shaft and the reciprocating object, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A device for integrating a sequence of equi-directional movements of an object reciprocating relative to a frame, particularly for measuring the sum of lengths of consecutive strokes in one direction of a reciprocating piston, comprising, in combination, shaft means rotatably supported in said frame; motion transfer means operatively connecting said reciprocating object with said shaft means including a rotary or pulley type take-up member mounted coaxially with said shaft means, an at least partly flexible strip attached with one end to said reciprocating object and with the other end to said rotary take-up member and partly wound thereabout for rotating said take-up member in one direction when said strip is moved in said one direction, spring means operatively connected to said take-up member for tensioning when said take-up member rotates in said one direction and for forcing said take-up member to rotate in the other direction when said one end of said strip is moved in the other direction, and overrunning clutch means mounted coaxially with said shaft means and operatively interconnecting said disc member with said shaft means for rotating said shaft means about said axis jointly with said take-up member when said member is rotated in one predetermined direction; and counting means operatively connected with said shaft means for counting and adding the angular movements thereof in said predetermined direction, so that the result of such counting operation during a given period of time is an indication of the sum total of the lengths of said strokes of said reciprocating object carried out during such period of time, even if said reciprocating movements are irregular in length and frequency.

2. A device as set forth in claim 1 also including motion arresting means attached to said shaft means to prevent rotation of said shaft means except in said one predetermined direction.

3. A device as set forth in claim 2 wherein said motion arresting means include second overrunning clutch means coaxially attached to said shaft means.

4. A device as set forth in claim 1 wherein said counting means includes a counting device and actuating means operable by the rotary movement of said shaft means for actuating said counting device, so that the result of such counting operation during a given period of time is an indication of the sum total of the lengths of said strokes of said reciprocating object carried out during such period of time.

5. A device as set forth in claim 4 wherein said actuating means includes a cam rotating jointly with said shaft means and a cam follower cooperating with said cam and operatively connected to said counting device.

6. A device as set forth in claim 1 wherein said counting means include an electrical counting device and electrical circuit means connected therewith and also including contact means for closing and interrupting said circuit means operable by the rotary movement of said shaft means for actuating said counting device so that the result of such counting operation during a given period of time is an indication of the sum total of the lengths of said strokes of said reciprocating object carried out during such period of time.

References Cited by the Examiner

UNITED STATES PATENTS

| 1,977,498 | 10/1934 | Staegemann | 235—61 |
| 1,993,707 | 3/1935 | Rosecrans | 235—61 |
| 2,123,978 | 7/1938 | Wagner | 235—61 |
| 3,104,056 | 9/1963 | Cross | 235—61 |

FOREIGN PATENTS 236,622   7/1925   Great Britain.

LOUIS J. CAPOZI, *Primary Examiner.*

LEO SMILOW, *Examiner.*

T. J. ANDERSON, *Assistant Examiner.*